(No Model.)
A. W. LANE.
VEHICLE BRAKE.
No. 386,595. Patented July 24, 1888.
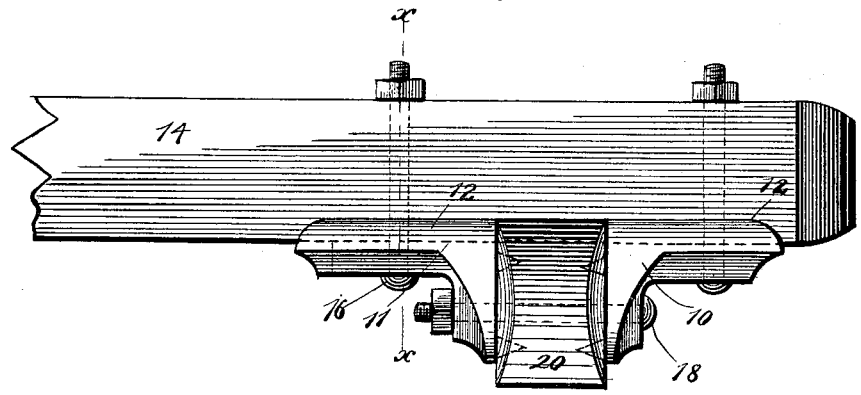
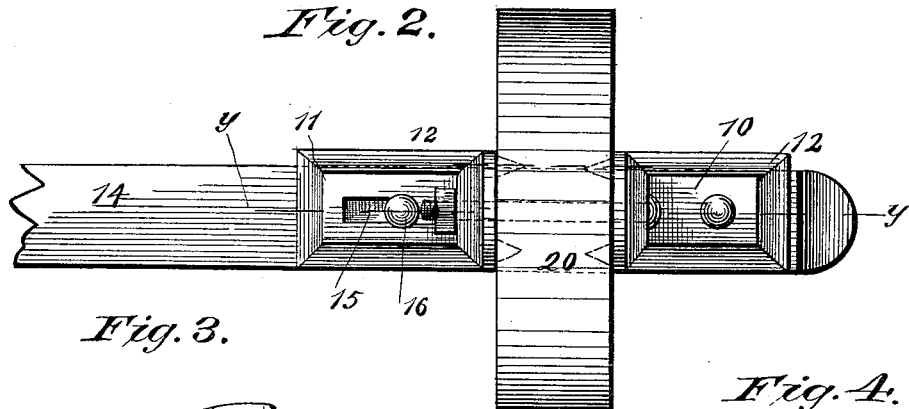
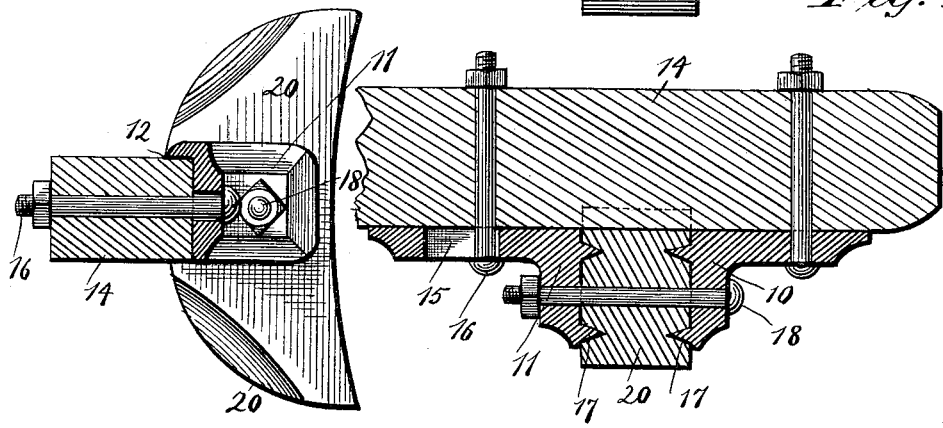
WITNESSES:
INVENTOR:
A. W. Lane
BY Munn & Co.
ATTORNEYS.

UNITED STATES PATENT OFFICE.

ANDREW WILSON LANE, OF SUSANVILLE, ASSIGNOR TO HIMSELF, AND JAMES L. McDERMOTT, OF MILFORD, CALIFORNIA.

VEHICLE-BRAKE.

SPECIFICATION forming part of Letters Patent No. 386,595, dated July 24, 1888.

Application filed January 5, 1888. Serial No. 259,862. (No model.)

*To all whom it may concern:*

Be it known that I, ANDREW WILSON LANE, of Susanville, in the county of Lassen and State of California, have invented a new and Improved Vehicle-Brake, of which the following is a full, clear, and exact description.

This invention relates to vehicle-brakes, the object of the invention being to provide for the ready and secure attachment of the brake-shoe to the brake-bar, the invention consisting of certain novel constructions and combinations, which will be hereinafter described, and specifically pointed out in the claims.

Reference is to be had to the accompanying drawings, forming a part of this specification, in which similar figures of reference indicate corresponding parts in all the views.

Figure 1 is a plan view of a portion of a brake-bar, representing the same as it appears when provided with my improved brake-shoe-attaching device. Fig. 2 is a face view of the same. Fig. 3 is a cross-sectional view taken on line $x\ x$ of Fig. 1, and Fig. 4 is a longitudinal sectional view taken on line $y\ y$ of Fig. 2.

In constructing a brake such as the one forming the subject-matter of this application, I provide two side clips, 10 and 11, each of which is provided with an overhanging flange or lip, 12, the clip 10 being arranged so that it may be permanently bolted to a brake-bar, as 14, while the clip 11 is formed with a longitudinal slot, 15, through which there is passed a bolt, 16, that extends through the brake-bar 14.

The approaching faces of the two clips are formed or provided with spurs 17, and the rear face of the brake shoe or block 20, that is to be held by the clips, is recessed in order that a better bearing may be obtained upon the brake-bar, the block being held to place between the clips by a retaining-bolt, 18, which passes through the clips and through the block, the nut of the bolt 18 being turned home, so as to cause the spurs 17 to enter the side faces of the block.

With such a brake as the one above described the block or shoe 20 will be rigidly held against the bar, and blocks of almost any thickness may be clamped to place between the clips, owing to the adjustable nature of the clip or bracket 11.

Having thus described my invention, I claim as new and desire to secure by Letters Patent—

1. In a brake-shoe, the ⊓-shape brackets 10 11, having their adjacent faces provided with spurs 17, and their oppositely-projecting attaching-arms provided with a transverse bolt-aperture and a slot, respectively, through which bolts may be passed into the brake-bar, substantially as set forth.

2. In a brake-shoe, the ⊓-shape brackets 10 11, the adjacent faces of which are provided with spurs 17, the oppositely projecting attaching-arms of the brackets being transversely apertured and slotted, respectively, and formed with longitudinally-extending flanges 12 along their upper and lower edges, substantially as set forth.

3. The combination, with a brake-bar, of a recessed block, 20, brackets 10 and 11, one of which is longitudinally slotted, and both of which are provided with flanges 12, bolts by which the brackets are secured to the brake-bar, and a bolt arranged to pass through the brackets and through the block, substantially as described.

ANDREW WILSON LANE.

Witnesses:
C. A. LOOMIS,
EDITH E. LOOMIS.